United States Patent

[11] 3,612,603

[72] Inventors David E. Snyder;
Joy G. Snyder, both of 5344 Pendleton St., San Diego, Calif. 92109
[21] Appl. No. 792,329
[22] Filed Jan. 21, 1969
[45] Patented Oct. 12, 1971

[54] TANDEM STROLLER
5 Claims, 6 Drawing Figs.

[52] U.S. Cl. ................................................. 297/130,
297/243, 280/43.38
[51] Int. Cl. ....................................................... A47d 1/10
[50] Field of Search .......................................... 297/243,
130, 232, 134; 280/47.38, 47.4; 296/63

[56] References Cited
UNITED STATES PATENTS

| | | | |
|---|---|---|---|
| 2,681,098 | 6/1954 | Bijold | 297/243 X |
| D.162,495 | 3/1951 | Trimble | 297/243 |
| 682,234 | 9/1901 | Bremser | 297/130 X |
| 1,063,884 | 6/1913 | Kern | 280/47.38 |
| 1,113,328 | 10/1914 | Goggin | 280/47.38 X |
| 2,512,995 | 6/1950 | Berger | 297/130 |
| 2,593,962 | 4/1952 | Barker | 280/43.38 X |
| 2,769,482 | 11/1956 | Carlson | 297/243 |
| 2,892,481 | 6/1959 | Seward | 297/243 X |
| 3,183,558 | 5/1965 | Cronin | 297/243 |
| 3,223,431 | 12/1965 | Gottfried | 297/134 |

FOREIGN PATENTS

| | | | |
|---|---|---|---|
| 880,143 | 10/1961 | Great Britain | 297/232 |

*Primary Examiner*—Francis K. Zugel
*Attorney*—Littlepage, Quaintance, Wray & Aisenberg ABSTRACT: A horizontal stroller frame with a detachable tandem seat assembly is disclosed herein. First, second and third upstanding members laterally span a base which is anchored on a stroller frame. The first member is a bumper handhold combination, and the second and third upright members are seats. In a preferred embodiment of the invention, the upright members comprise U-shaped tubes hinged at opposite ends to the base, and seats are hinged medially on the second and third members, so that the entire assembly may be folded into a flat compact apparatus.

PATENTED OCT 12 1971 3,612,603

INVENTORS
DAVID E. SNYDER
JOY G. SNYDER

BY *James C. Wray*

ATTORNEY

INVENTORS
DAVID E. SNYDER
JOY G. SNYDER

BY *James C. Wray*

ATTORNEY

TANDEM STROLLER

BACKGROUND OF THE INVENTION

Tandem strollers of a type generally described in this application are shown in U.S. Pat. No. 3,223,431, issued on Dec. 14, 1965, and in U.S. Pat. No. 1,842,159, issued on Jan. 19, 1932. Inherent complexity of those devices and the lack of the ability to attach the devices to conventional flat bed stroller frames, as well as the inability to inexpensively construct the devices and the difficulty to compact the devices into flat, thin, portable assemblies, are problems which still face the development and use of tandem strollers.

A conventional stroller must be capable of folding so that it may be transported in the trunk of a family car and so that it easily and quickly may be assembled at the place of its use. Most strollers have heretofore been designed for small infants in the 2 year and under age bracket, which are incapable of walking or which are incapable of walking at a parent's speed. The present invention has particular application to the use by families with more than one child of preschool age which are incapable of enduring the long walks required of or enjoyed by their parents. The present invention provides accommodation for two children with upper weight limits of approximately 45 pounds per child.

A typical infant stroller sometimes has an auxiliary seat or shopping basket behind the regular sets. If a mother places an older child in the auxiliary seat or stands the child in the basket, the center of balance is upset, and the entire stroller tends to tip over backwards. Popular strollers for twins have side-by-side seating. Those strollers are particularly difficult to control and to move in narrow spaces, such as on sidewalks and through aisles of stores.

Moreover, a need exists to provide a means to convert single seat infant strollers to two-seat preschool children carriers.

SUMMARY OF THE INVENTION

The present invention uses conventional stroller frames which are modified by removing the seats and sawing off the upper forward projecting U-shaped tubular tray supports. The tubular supports are cut off very close to and just slightly forward of hinged connections with diagonally positioned extensible stroller handles. Legs of the removed U-shaped bars are shortened, and the ends are flattened, and the removed bars are attached to the remaining stroller frames as braces between the rear wheels. Alternatively, wooden or steel braces are added between the rear wheels.

Tandem plywood seat assemblies are constructed by sawing plywood bases to fit inside stroller frames. Plywood bases are sufficiently long to extend over rear wheels to a short degree, and over the front wheels to a slightly larger degree. Seats are attached to the bases so that the centers of the rear seats are slightly rearward of vertical planes containing the rear wheel axles. The forward seats are constructed approximately centrally on the bases, with the centers of gravity of the seats slightly behind the axles of the swivel wheels, and with forward leg portions of the seats slightly behind vertical swivel axles of the turnable front wheels. At the extreme forward ends of the bases, handholds and bumpers are constructed, so that the handholds and bumper bars are slightly above the level of the seats.

In a preferred form of the invention, a tandem seat assembly, bases are made with rectangular tubular frames. Heavy wires welded to the tubes provide floors. Seats and handholds are formed of upstanding U-shaped tubular members. Forward, handhold members are shorter than the middle and rear upright members. The U-shaped elements are connected to the bases with locking hinges similar to hinges on folding card table legs, so that the U-shaped members are held locked in upright positions until they are intentionally folded toward the base. Forward handhold members fold rearward and the seat back members fold forward. Slightly above the middle of the seat backs, seats are attached.

The seats may be plywood slabs which are connected to the seat backs by pins to allow the seat to be folded parallel with the back. The seat may comprise a forward projecting U-shaped member with an attached heavy fabric or vinyl seat. A similar heavy fabric, vinyl or plywood sheet may be connected to the seat back between the top of the back and the line at which the seat joins the back.

Rectangularly bent rods are connected to the fronts of the seats and to the sides of the bases directly beneath the seats and the rods are of appropriate height so that the rods support the seats parallel to the bases. The rods swing forward with the seat fronts when the seats are folded, maintaining the seats and bases in parallel relationship. The U-shaped seat backs and handholds are constructed of such size and shape that they fold upon each other in the collapsed arrangement.

Bases are attached to stroller frames by resting the bases on the forward and rear members of the frames. Crosspieces are attached beneath the bases and hold the bases and seats firmly attached to the frames. Additional forward cleats further aid in the longitudinal positioning of the bases upon the stroller frames. Stroller frames and seat bases may be interconnected by sliding front cleats on the bases beneath frontal pieces of the strollers' tubular frames and dropping the bases onto the frames, with the rear cleats of the bases extending across stroller frames just ahead of the rear members of the frames, so that the frames and bases are rigidly connected. The seat assemblies and stroller frames may be readily separated by lifting the rear of the bases from the stroller frames and sliding the bases rearwardly with respect to the frames.

Rear upstanding seat members may be constructed so that upper U-shaped portions may be removed and so that inclined infant seats may be connected to the rear seat backs. The infant seats are boxes constructed with inclines similar to those of well-known infants' seats. Straps are provided in the boxes to hold infants therein. As modified for the present invention, the infant seats have two tubes which fit within the tubular legs of the seat backs, once the U-shaped tops have been removed, to hold the infant seats firmly attached to the stroller frames.

In another modification, tandem preschooler seats are constructed with plywood bases. Seats are constructed with open ended boxlike construction by fastening seat sides to lateral edges of the plywood bases, and by placing plywood seats across the tops of the sides. Plywood backs are attached to the sides and to the seats. Handholds are constructed of upright boards attached to the leading edges of the plywood bases, and handhold or bumper bars connected across the tops of the upright boards. As in the tubular frame modification, seat belts are added to the seats for the safety of the riders and for the convenience of the pushers.

In a preferred mode of use, older or heavier children climb into the front seat and younger or lighter children are lifted into the rear seat. Weight distribution is such that most of the weight will be on the rear nonsteerable wheels, while sufficient weight will be forward of the rear wheels to insure that the strollers do not tip backward.

The present stroller is particularly adaptable to be marketed as a conversion unit for family-owned strollers which have been outgrown by infants. Tubular or plywood seat assemblies for strollers are marketed in a kit. In the case of rigid plywood stroller seat assemblies, the stroller modifications are shipped in knocked-down configuration with he instructions for assembling. Collapsible stroller seats are assembled and shipped in a folded condition. In plywood modifications, for example, forward bumpers are hinged to fold rearwardly and to lock in upright position. Lateral upright side portions of the seats are hinged to the plywood bases to fold inwardly, and the seat portions are configured to fit over the side portions to hold the sides and seats in assembled position. Backs have vertical grooves which fit over pins extending rearward from the seat sides to further hold the seat assemblies in rigid position.

Preferably, seat assemblies are marketed with bases sufficiently narrow to fit all existing stroller frames. Front cleats are adjustable upward or downward to engage the front bar of a stroller frame. Forward and rear laterally extending cleats are provided to fit either inside or outside of front and rear pieces of stroller frames, so that the bases can be dropped into position on the stroller frames. With each kit are provided instructions for removing tray supports from conventional strollers, as well as crosspieces of adjustable length to attach at the rear of the strollers. Strollers that are made specifically for adaption to the present tandem seats have cross braces in the rear of the horizontal frames and have removable tray supports. Tandem strollers of the present invention are marketed in preassembled condition, folded for shipping or tandem inserts are marketed together with infant seats which are installed alternatively in place of the rear seats.

Overall dimensions of the present tandem seat strollers are very little different than the dimensions of the present single seat strollers. Popular conventional strollers collapse to approximately 33×18×9 inches. Removable shade canopies may or may not be included in the dimensions. Tandem seat dimensions in the preferred tubular embodiment are approximately 36×12×6 inches when collapsed. In solid plywood models, dimensions are approximately 36×12×18 inches.

This invention has as one objective the providing of a combined stroller frame and tandem seat with the seats and a handhold supported on a base which is anchored to a flat horizontal stroller frame.

Another objective of this invention is the provision of a tandem seat assembly for insertion into a stroller frame, which seat assembly includes a base, forward and rear seats, and a handhold in front of the forward seat.

This invention has as a third objective the provision of a collapsed tubular frame tandem seat assembly for insertion into a stroller frame.

Another objective of this invention is the provision of a rigid plywood tandem seat assembly for insertion into a stroller frame, the seat assembly comprising forward and rear boxlike seats with backs and a forward handhold and bumper combination in front of the forward seat.

These and other modifications and objectives will be apparent from the specification, which includes the claims, and from the drawings.

DETAILED DESCRIPTION OF THE DRAWINGS

Figure 1:
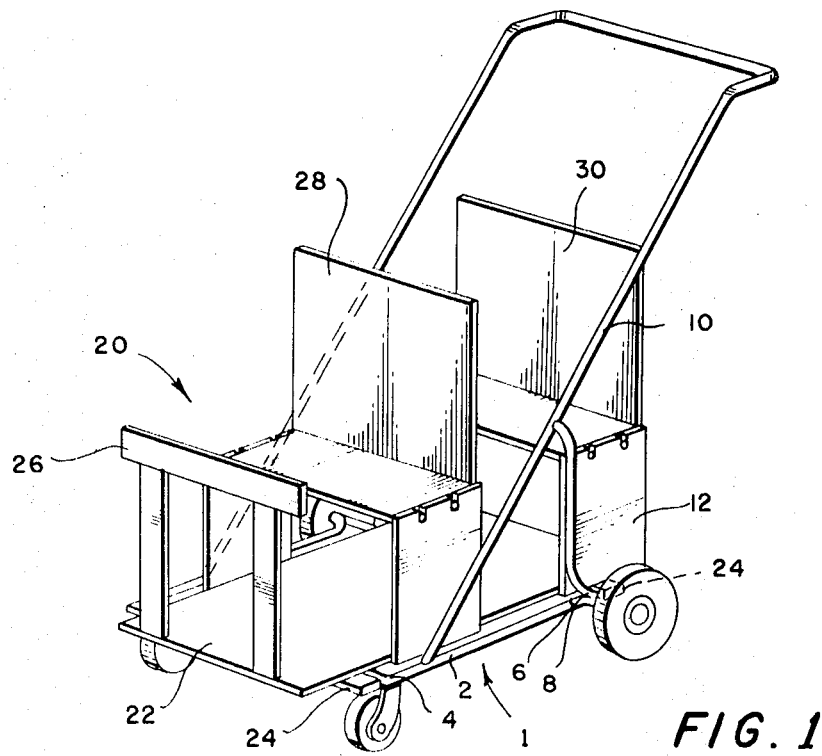
FIG. 1 is an illustration of a plywood seat positioned in a flat base stroller frame.

Referring to FIG. 1, a stroller frame is generally indicated by the numeral 1. The stroller frame comprises a horizontal frame having sidepieces 2, a frontal piece 4, and a rear piece 6. A reinforcing crossmember 8 is added to the rear of the frame parallel to the rear piece 6. The frame has a diagonally disposed telescopically collapsible handle 10 and S-shaped support pieces 12. In conventional strollers the S-shaped support pieces continue forward and merge in U-shaped frontal members which are tray supports for strollers. Modifying a conventional stroller frame for the present invention, a U-shaped frontal piece or tray support has been detached from the S-shaped handle supports 12 just forward of the junction of the handle 10 and handle supports 12. As in conventional strollers, the handles are pivoted to opposite side members 2, and the S-shaped supports 12 are pivoted to the side members 2, and handles 10 and supports 12 are interconnected so that the assemblies may be folded.

Figure 2:
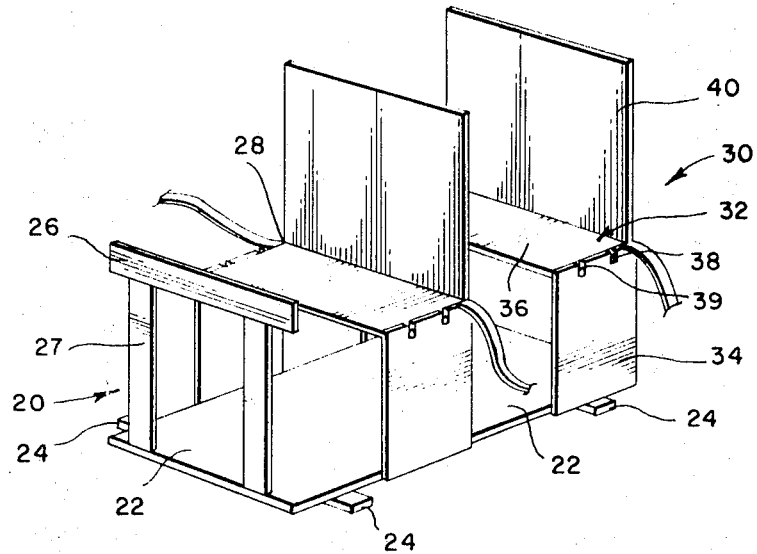
FIG. 2 is a perspective detail of the plywood seat assembly.

A plywood tandem seat assembly generally indicated by the number 20 is positioned in the stroller frame 1. With reference to FIGS. 1 and 2, tandem seat assembly 20 comprises base 22 which extends forward and rearward from stroller frame 1. Base 22 has cleats 24 which anchor the base on stroller frame 1. Cleats 24 are positioned beneath base 22 to lie forward and behind crosspieces 4 and 8 of stroller frame 1.

Three upright members comprise a handhold 26, a forward seat 28 and a rear seat 30. Rear seat 30 is formed of a boxlike seat 32 which comprises two upright side portions 34 connected to lateral edges of base 22. Seat 36 rests on top of the sides 34. Seat 36 is permanently fixed to sides 34 such as by screws, or pins 38 extending from lateral edges of seat 36 may fit within grooves 39 in sides 34 to form a rigid unit in the collapsible modification. Seat back 40 permanently attached to sides 34 and seat 36 in the rigid embodiment. In the collapsible embodiment, seat back 40 is hinged to seat 36, and back 40 has downward opening slots which fit over pins extending from rearward edges of side piece 34. Front seat 28 is constructed similar to rear seat 30. Front seat 28 is positioned approximately medially on base 22. Handhold 26 is connected adjacent the leading edge of base 22 by upright members 27. In the collapsible embodiment, members 27 are hinged to base 22 to fold rearwardly and to lock in an upright position.

Figure 3:
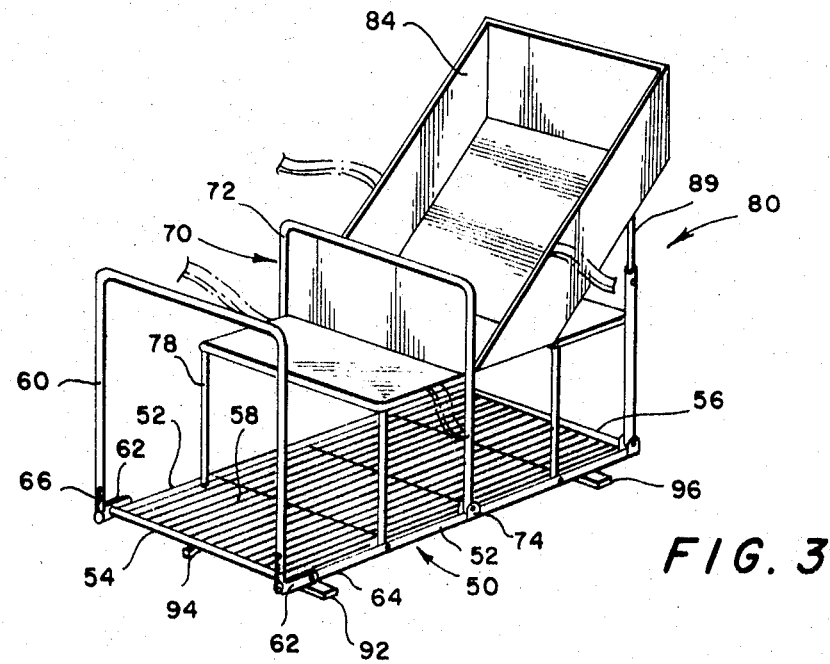
FIG. 3 is a perspective view of a preferred embodiment of the invention, which is a tubular frame seat assembly for use with a stroller frame.
Figure 4:
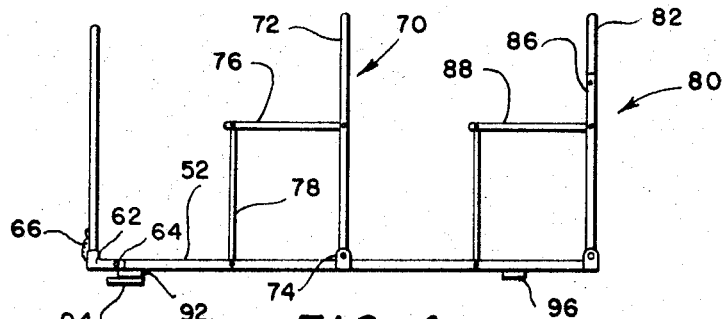
FIG. 4 is a side elevation of a tandem seat assembly similar to that shown in FIG. 3, showing the foldable nature of the seat.
Figure 5:
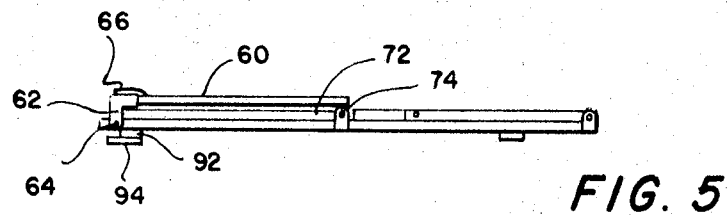
FIG. 5 is a side elevation of the seat assembly of FIG. 4 in a collapsed position.

As shown in FIGS. 3, 4 and 5, a preferred embodiment of the invention is constructed with a rectangular tubular base 50. Sidepieces 52 are permanently attached to frontal piece 54 and to rear piece 56. Wires or rods 58 extend across base 50 and are welded to respective side, front and rear tubes to form a floor for the tandem seat assembly. Forward upstanding handhold member 60 is made of a U-shaped tubular piece. L-shaped hinge pieces 62 are connected to the bottoms of the legs of handhold 60. Angle pieces 62 are connected to sidepieces 52 of base 50 by pins 64. Clips 66 attached to the lower forward edges of legs of handhold 60 engage the forward edges of sidepieces 52 to hold handhold 60 in upright position. Forward seat 70 has a U-shaped upstanding member 72. Free ends of upright member 72 are pinned to two-position locking hinges 74 which allow members 72 to be folded forward to a collapsed position as shown in FIGS. 4 and 5. When member 72 is upright, locking hinges 74 hold seat 70 in its operative position. Seat 76 is hinged to U-shaped member 72, and the forward edge of seat 76 is supported by a rectangular rod 78 which extends through sidepieces 52 of base 50 and into forward portions of lateral edges of seat 76. The rectangular arrangement of seat 76, rod 78, U-shaped bar 72 and the sides 52 of base 50 allows seat 76 and rod 78 to be folded forward with the bar 72. Rear seat 80 is constructed in a similar manner to forward seat 70.

Figure 6:
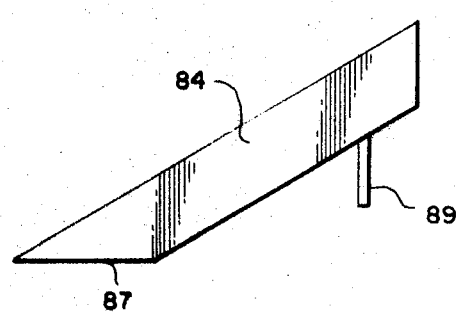
FIG. 6 is a side elevation of a modified infant seat for use in place of a rear seat in he tandem seat assembly.

In a modification of the invention shown in FIGS. 3 and 6, the upper U-shaped portion 82 of the upstanding member of rear seat 80 is removable. A sloped infant seat 84 similar to conventional types which are commercially marketed has fixed to the base thereof, tubes 89 which fit within upper open ends of the upright tubes 86 of seat 80. Lower portion 87 of infant seat 84 rests upon the rear seat 88.

Bar 92 extends laterally beneath base 50 adjacent its forward edge to rest against frontal piece 4 of stroller frame 1 in FIG. 1. Forward cleat 94 extends under the frontal piece 4 of stroller frame 1 to further anchor the seat assembly on the frame. A laterally extending bar 96 forms a rear cleat which lies in he stroller frame forward of rear crosspiece 6. The seat assembly is placed in the stroller frame by inclining the assembly forward and downwardly and inserting cleat 94 beneath the frontal piece 4 of the stroller frame. The rear of the seat assembly is then lowered, and bar 96 falls into place ahead of the rear crosspiece 6 of the stroller frame 1.

Although this invention has been described with reference to preferred and specific embodiments thereof, it will be obvious to one skilled in the art that modifications may be made without departing from the teachings of this invention. The scope of this invention is defined precisely in the following claims which are a part of this disclosure and specification.

We claim:

1. A child-carrying tandem seat assembly for positioning on a stroller frame comprising a flat planar base having connected thereto means to position the base on a rectangular frame, a forward upstanding member connected to the base adjacent a leading edge thereof, a second upstanding member independently connected to the base and extending across a medial portion thereof and a third upstanding member independently connected to the base and extending across a rearward portion thereof and being separate from the second upstanding member, the first upstanding member comprising a handhold, and the second and third upstanding members comprising seat and back portions, the first, second and third upstanding members being hinged to the base and being foldable toward a plane of the base, and seat and back portions being foldable together.

2. A child-carrying tandem seat apparatus for positioning on a stroller frame comprising a base having connected thereto means to attach the base to a rectangular frame wherein the base comprises a rectangular tubular frame having spaced opposite side tubes joined by front and rear tubular members, and wherein the means to attach the base to a frame of a stroller comprises transverse members connected to opposite side tubes and extending laterally therebeyond and at least one end cleat connected beneath the base and extending longitudinally therebeyond, a forward upstanding member connected to the base adjacent a leading edge thereof, a second upstanding member connected to the base and extending across a medial portion thereof and a third upstanding member connected to the base and extending across a rearward portion thereof, the first upstanding member comprising a handhold, and the second and third upstanding members comprising seats.

3. Child-carrying tandem seat apparatus for positioning on a stroller frame comprising a base member having connected thereto means to position the base on a rectangular frame, a forward upstanding member connected to the base adjacent a leading edge thereof, a second upstanding member connected to the base member and extending across a medial portion thereof and a third upstanding member connected to the base member and extending across a rearward portion thereof, the first upstanding member comprising a handhold, and the second and third upstanding members comprising seats, wherein the first upstanding member comprises an inverted U-shaped tubular member having opposite ends connected to forward corners of the base, wherein the second upstanding member comprises an inverted U-shaped tubular member having opposite ends connected to opposite sides of the base member, and wherein the third upstanding member comprises first and second upstanding tubes connected to rear corners of the base member, upper portions of the tubes being interconnected, the second and third upstanding members further comprising seats projecting forward therefrom at points intermediate upper and lower ends thereof, and wherein the first upstanding member is hinged to the base member for folding movement rearwardly and downwardly, wherein the second and third upstanding members are hingedly connected to the base member for folding movement forwardly and downwardly, and wherein the seats are hingedly connected to the second and third upstanding members for movement toward upper portions of the upstanding members.

4. The child-carrying apparatus of claim 3 wherein hinge connections between the first, second and third upright members comprise locking hinges for locking the members in upright position.

5. The child-carrying apparatus of claim 3 further comprising an infant seat box having attached to the bottom thereof vertical legs, and wherein an upper U-shaped portion of one of the upstanding members is removable for leaving spaced tubes which receive the vertical legs of the infant seat.